US011823425B2

United States Patent
Wang et al.

(10) Patent No.: US 11,823,425 B2
(45) Date of Patent: Nov. 21, 2023

(54) FEW-SHOT DEFECT DETECTION METHOD BASED ON METRIC LEARNING

(71) Applicant: Nanjing University of Aeronautics and Astronautics, Nanjing (CN)

(72) Inventors: Jun Wang, Nanjing (CN); Zhongde Shan, Nanjing (CN); Shiyan Hua, Nanjing (CN); Dawei Li, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 18/316,326

(22) Filed: May 12, 2023

(65) Prior Publication Data

US 2023/0281972 A1    Sep. 7, 2023

(51) Int. Cl.
| | | |
|---|---|---|
| *G06V 10/774* | (2022.01) | |
| *G06T 7/00* | (2017.01) | |
| *G06V 10/764* | (2022.01) | |
| *G06T 7/73* | (2017.01) | |

(Continued)

(52) U.S. Cl.
CPC .......... *G06V 10/774* (2022.01); *G06T 7/0004* (2013.01); *G06T 7/73* (2017.01); *G06V 10/764* (2022.01); *G06V 10/7715* (2022.01); *G06V 10/82* (2022.01); *G06T 2207/20021* (2013.01); *G06T 2207/20081* (2013.01); *G06T 2207/20084* (2013.01); *G06T 2207/30164* (2013.01)

(58) Field of Classification Search
CPC .. G06V 10/774; G06V 10/7715; G06V 10/82; G06V 10/764; G06T 7/73; G06T 7/0004; G06T 2207/20021; G06T 2207/20081; G06T 2207/20084; G06T 2207/30164
See application file for complete search history.

(56) References Cited

U.S. PATENT DOCUMENTS

| | | | |
|---|---|---|---|
| 11,216,927 B2* | 1/2022 | Peng | ........................ G06N 3/045 |
| 11,367,225 B2* | 6/2022 | Shimodaira | .............. G06N 3/08 |

FOREIGN PATENT DOCUMENTS

| | | | |
|---|---|---|---|
| CN | 109376578 A | | 2/2019 |
| CN | 110726724 A | | 1/2020 |
| CN | 111461244 A | * | 7/2020 |

(Continued)

OTHER PUBLICATIONS

Tang Hao et al.,"Dual Generator Generative Adversarial Networks for Multi-Domain Image-to-Image Translation", https://arxiv.org/pdf/1901.04604.pdf, pp. 1-16.

(Continued)

*Primary Examiner* — Pinalben Patel

(57) ABSTRACT

A few-shot defect detection method based on metric learning, including: (S1) performing data enhancement on a to-be-detected few-shot defect data set through a $G^2$-Generative adversarial network ($G^2$-GAN); (S2) extracting features of a defect data set similar to the to-be-detected few-shot defect data set based on an adaptive convolution kernel-based convolutional neural network (SKM-CNN) to generate a pre-training model; and (S3) transferring the pre-training model to a few-shot defect detection network ($S^2D^2N$) based on metric learning; and performing target feature extraction and metric learning in sequence to realize rapid identification and location of defects.

4 Claims, 4 Drawing Sheets

(51) Int. Cl.
*G06V 10/77* (2022.01)
*G06V 10/82* (2022.01)

(56) References Cited

FOREIGN PATENT DOCUMENTS

| CN | 113435509 A | * | 9/2021 |
|---|---|---|---|
| CN | 113674247 A | | 11/2021 |

OTHER PUBLICATIONS

Jian Huang et al.,"Few-Shot Metric Transfer Learning Network for Surface Defect Detection", Pattern Recognition and Artificial Intelligence, 2021, vol. 34, Issue 5, pp. 407-414.

* cited by examiner

FEW-SHOT DEFECT DETECTION METHOD BASED ON METRIC LEARNING

CROSS-REFERENCE TO RELATED APPLICATIONS

This application claims the benefit of priority from Chinese Patent Application No. 202210517000.3, filed on May 13, 2022. The content of the aforementioned application, including any intervening amendments thereto, is incorporated herein by reference.

TECHNICAL FIELD

This application relates to defect detection of large assembly components, and more particularly to a few-shot defect detection method based on metric learning.

BACKGROUND

At present, the computer vision is mainly used for detection, classification, and segmentation, which are implemented based on massive labeled images. The deep learning algorithm has many advantages, such as good universality, high detection precision, strong robustness, and good generalization ability. Large-scale high-end equipment for aviation, aerospace and navigation ("three voyages") is the guarantee of national defense and security and forms an important part of China's equipment manufacturing industry. The product quality of high-end equipment directly affects the final combat performance and international competitiveness.

The automatic surface defect detection of the large assembly components is of great significance for ensuring the normal operation of the high-end equipment, but in the actual application, it is often difficult to acquire enough defect data, which greatly lowers the defect detection efficiency and precision of the large assembly components, affecting the assembly speed of the large assembly components and the safety performance of high-end equipment.

Abundant prior knowledge has been formed through the human-eye cognition, such that the types of new things can be determined quickly through extremely few mental activities. Similarly, in the field of deep learning, it is urgently needed to establish an excellent model with strong generalization ability through a small amount of data.

The defect seriously affects the safety performance and service life of the high-end equipment. The visual detection struggles with high labor intensity, large time consumption, and poor efficiency, and is susceptible to subjective experience and human errors, which makes it hard to guarantee the defect detection efficiency and accuracy, rendering the assembly speed of the subsequent large assembly components uncontrollable and affecting the quality of the high-end equipment.

Before the deep learning, the defect detection algorithm is often implemented by manual feature extraction, which manifests low efficiency, poor extraction accuracy, and low intelligent degree, so that the practicability and generalization of the model are greatly attenuated. The deep learning algorithm relies on a large amount of trainable data, and cannot be fully operated in the case of a few-shot data set.

SUMMARY

An object of this disclosure is to provide a few-shot defect detection method based on metric learning to overcome the defects in the prior art. The few-shot defect detection method provided herein realizes the detection of fine defects of large assembly components in the case of a few-shot data set, and has improved defect detection accuracy, efficiency, and intelligence.

The technical solutions of the disclosure are described below.

This application provides a few-shot defect detection method based on metric learning, comprising:
- (S1) performing data enhancement on a to-be-detected few-shot defect data set by a $G^2$-Generative adversarial network ($G^2$-GAN);
- (S2) extracting features of a defect data set similar to the to-be-detected few-shot defect data set by using a convolutional neural network based on selective kernel module (SKM-CNN) to generate a pre-training model; and
- (S3) transferring the pre-training model to a few-shot defect detection network ($S^2D^2N$) based on metric learning; and performing target feature extraction and metric learning in sequence to realize identification and location of defects.

In some embodiments, step (S1) further comprises:
- (S1.1) modifying a GAN to acquire the $G^2$-GAN, wherein the $G^2$-GAN comprises a first generator $G_1$, a second generator $G_2$, and a discriminator D; and setting the to-be-detected few-shot defect data set as a real sample set T; and adding random noise to a randomly-generated manufacturing sample to generate an initial manufacturing sample $C_1$;
- (S1.2) subjecting the initial manufacturing sample $C_1$ to rough processing by using the first generator G to generate a manufacturing sample $C_2$;
- (S1.3) simultaneously inputting a feature image of the real sample T and the manufacturing sample $C_2$ into the second generator $G_2$; and optimizing the manufacturing sample $C_2$ by using the feature image of the real sample T to obtain a manufacturing sample $C_3$, wherein the feature image is generated by a feature extraction module formed by N convolution layers and inverted residual modules alternately arranged; and
- (S1.4) simultaneously inputting the manufacturing sample $C_3$ and the real sample T into the discriminator D to determine whether the manufacturing sample $C_3$ is the real sample T; if yes, outputting the manufacturing sample $C_3$; otherwise, indicating that the manufacturing sample $C_3$ is not similar enough to the real sample T, and returning the manufacturing sample $C_3$ back to the first generator $G_1$ and repeating steps (S1.2)-(S1.4) until the manufacturing sample $C_3$ is determined to be the real sample T.

In some embodiments, step (S2) further comprises:
- (S2.1) searching a public data set with similar defects to the to-be-detected few-shot defect data set as an auxiliary data set;
- (S2.2) extracting features of the auxiliary data set by using the SKM-CNN; and
- (S2.3) saving the pre-training model.

In some embodiments, step (S2.2) comprises:
- (S2.2.1) extracting the features of the auxiliary data set through a combination of convolution layer, SKM attention module and deep convolution, wherein the SKM attention module is configured to adaptively adjust a size of a convolution kernel according to target size and distance such that the SKM-CNN obtains different receptive field information;
- (S2.2.2) increasing a resolution of a feature image by primary up-sampling and secondary up-sampling;

(S2.2.3) repeatedly utilizing, by a region-of-interest (ROI) pooling layer, a feature map generated in CNN to accelerate training and test of the pre-training model; and (S2.2.4) performing classification and prediction on the features of the auxiliary data set by using the convolution layer and a fully connected layer.

In some embodiments, in step (S2.2), two skip connections are performed when the features of the auxiliary data set are extracted; a feature map after the SKM attention module is fused to be ahead of the secondary up-sampling, and a feature map before the primary up-sampling is fused to be after the ROI pooling layer, so that the pre-training model retains sufficient local feature information and generalization of the pre-training model is enhanced.

In some embodiments, step (S3) further comprises:
(S3.1) dividing the to-be-detected few-shot defect data set after the data enhancement into a support image data set and a query image data set;

(S3.2) introducing the pre-training model obtained in step (S2) into in a feature pyramid network (FPN); performing up-sampling on high-level features, top-down connection on low-level features and connection between peer levels; and performing defect feature learning by using three different scale spaces to enhance perception of the SKM-CNN to defects with different scales, so as to complete extraction of target features;

wherein after the extraction of the target features, the support image data set and the query image data set generate category features and defect features; and (S3.3) calculating a distance between a category feature matrix and a defect feature matrix; and determining defect category according to a preset threshold range; wherein if the distance falls within the preset threshold range, a defect location is marked on a few-shot image.

Compared to the prior art, the present disclosure has the following beneficial effects.

(1) The diversity of the few-shot defect data is increased by expanding a small data set through the GAN.

To solve the problems of low detection precision, low reliability, and overfitting after the training of a few-shot data set, the $G^2$-GAN is introduced herein, in which the real sample information is introduced based on the GAN. The generation of manufacturing samples is accelerated through two generators, and the few-shot defect set is expanded, increasing the sample diversity.

(2) A CNN based on attention mechanism is designed to train a data set sharing common features with the small sample, so as to generate a pre-training model, which is then transferred and learned to improve the detection precision.

The features of the auxiliary data set are extracted by using SKM-CNN to generate the pre-training model. The SKM attention module can adaptively adjust the convolution kernel size according to the object size and the distance from the imaging device to obtain feature images with different receptive fields. After the addition of the attention module, the network can automatically learn the optimal weight distribution, facilitating improving the generalization ability of the pre-training model.

(3) According to the hierarchical neural network model with sequential target feature extraction and metric learning, the defect detection can be quickly and efficiently completed, and the problems of poor detection precision, low reliability, and overfitting in the model trained in the lack of sample data are solved.

A few-shot defect detection network $S^2D^2N$ based on metric learning is introduced, and the loading of the pre-training model is loaded as the first step of a target feature extraction module. After that, a distance between a category feature matrix and a defect feature matrix is calculated, and the defect category and location are determined according to the distance.

(4) This application enables the high-precision detection of small defects of large assembly components in the case of a few-shot data set, and reduces the interference of human subjectivity, facilitating the assembly of the large assembly components, the stable operation of the high-end equipment, and the relieving of labor intensity.

DETAILED DESCRIPTION OF EMBODIMENTS

The embodiments of this application will be described in detail below with reference to the accompanying drawings.

As shown in FIGS. 1-4, a few-shot defect detection method based on metric learning is illustrated, which includes the following steps.

(S1) Data enhancement is performed on a to-be-detected few-shot defect data set by a $G^2$-Generative adversarial network ($G^2$-GAN).

(S2) Features of a defect data set (auxiliary data set) similar to the to-be-detected few-shot defect data set are extracted by using an adaptive convolution kernel-based convolutional neural network (SKM-CNN) to generate a pre-training model.

(S3) The pre-training model is transferred to a few-shot defect detection network ($S^2D^2N$) based on metric learning. Target feature extraction and metric learning are performed on the pre-training model in sequence to realize rapid identification and location of defects.

In some embodiments, step (S1) includes the following steps.

(S1.1) The to-be-detected few-shot defect data set is set as a real sample set T. An initial manufacturing sample $C_1$ is generated by adding random noise to a randomly-generated manufacturing sample.

(S1.2) The initial manufacturing sample $C_1$ is subjected to rough processing by using a first generator G to generate a manufacturing sample $C_2$.

(S1.3) A feature image of the real sample T and the manufacturing sample $C_2$ are simultaneously inputted into a second generator $G_2$. The manufacturing sample $C_2$ is optimized by using the feature image of the real sample T to obtain a manufacturing sample $C_3$, where the feature image is generated by a feature extraction module formed by N convolution layers and inverted residual modules alternately arranged.

Figure 1:
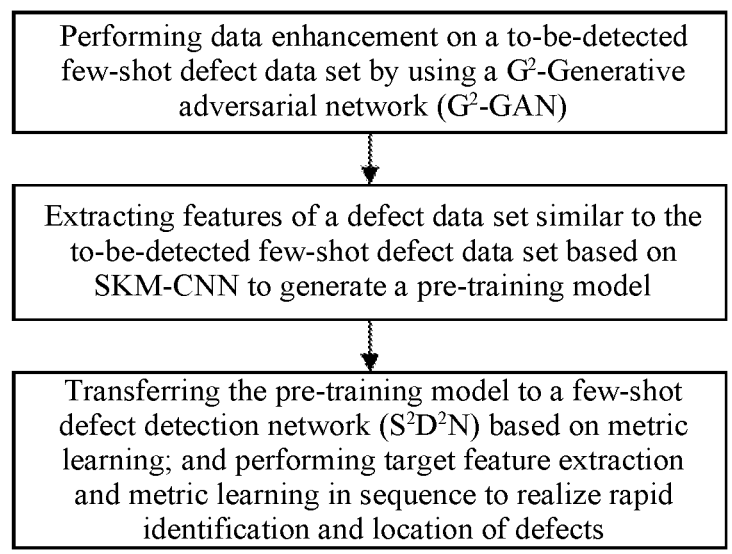
FIG. 1 is a flow chart of a few-shot defect detection method based on metric learning according to an embodiment of this disclosure.
Figure 2:
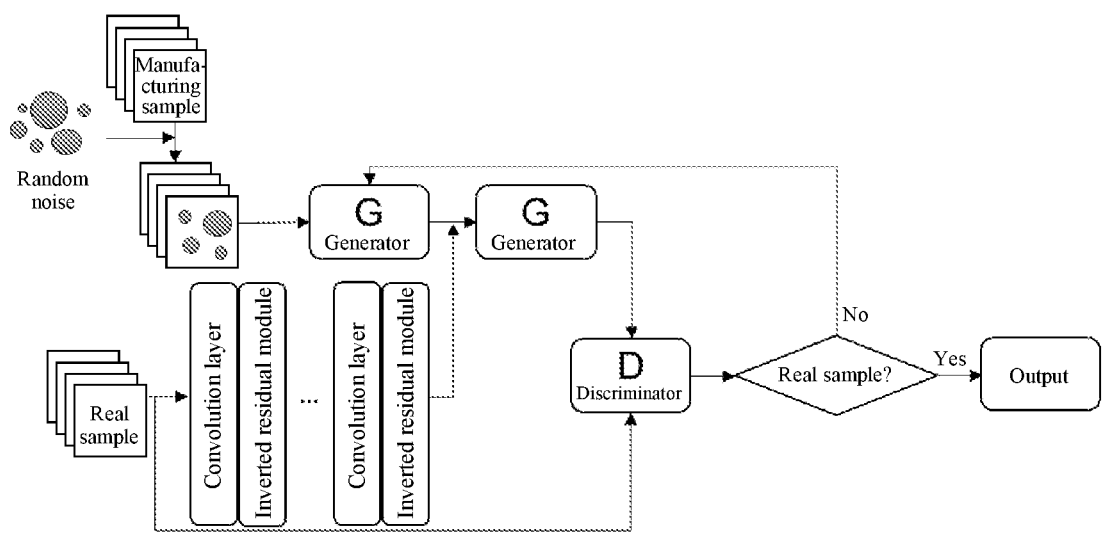
FIG. 2 is a structural diagram of a $G^2$-Generative adversarial network ($G^2$-GAN) according to an embodiment of this disclosure.

(S1.4) The manufacturing sample $C_3$ and the real sample T are simultaneously inputted into a discriminator D. Whether the manufacturing sample $C_3$ is the real sample T is determined, if yes, the manufacturing sample $C_3$ is outputted; otherwise, it indicates that the manufacturing sample $C_3$ is not similar enough to the real sample T, and the manufacturing sample $C_3$ is returned back to the first generator $G_1$ to repeat steps (S1.2)-(S1.4) until the manufacturing sample $C_3$ is determined to be the real sample T. FIG. 2 illustrates a structural diagram of the $G^2$-GAN, which is obtained by modifying the GAN. The $G^2$-GAN includes the first generator $G_1$, the second generator $G_2$, and the discriminator D. By using the $G^2$-GAN, sufficient real sample can be generated, and the few-shot defect data set can be expanded.

In some embodiments, step (S2) includes the following steps.

(S2.1) A public data set with similar defects to the to-be-detected few-shot defect data set is searched as an auxiliary data set.

(S2.2) Features of the auxiliary data set are extracted by using the SKM-CNN.

The features of the auxiliary data set are extracted through a combination of convolution layer, SKM attention module and deep convolution, where the SKM attention module is configured to adaptively adjust a size of a convolution kernel according to target size and distance such that the SKM-CNN obtains different receptive field information, which is favorable for the extraction of the features of the auxiliary data set.

Different from a common convolution operation, in the deep convolution operation, the convolution is performed on the space and the channel successively, which achieves the separation of the channel and the space, increases the learning modes of the convolution, and reduces the quantity of parameters generated in the convolution process.

The present network increases the resolution of the feature image by two up-sampling operations, and improves the resolution of the final output feature image. A feature image generated in the SKM-CNN is reused by the ROI pooling layer to accelerate the training and detection process.

Finally, the features are classified and predicted by using the convolution layer and a fully connected layer.

To strengthen the fusion between the low-level feature and the high-level feature, a two skip connection are performed. A feature map after the SKM attention module is fused to be ahead of the secondary up-sampling, and a feature map before the primary up-sampling is fused to be after the ROI pooling layer, so that the pre-training model retains sufficient local feature information and generalization of the pre-training model is enhanced.

(S2.3) The pre-training model is saved.

Figure 3:
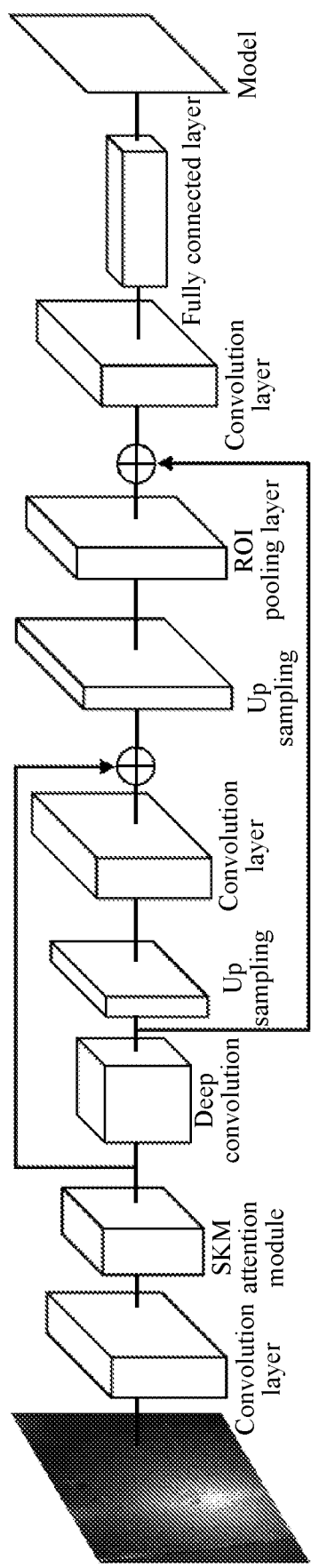
FIG. 3 is a structural diagram of an adaptive convolution kernel-based convolutional neural network (SKM-CNN) according to an embodiment of this disclosure.

FIG. 3 shows a structural diagram of the SKM-CNN.

In some embodiments, step (S3) includes the following steps.

(S3.1) The to-be-detected few-shot defect data set after the data enhancement is divided into a support image data set and a query image data set.

(S3.2) The pre-training model obtained in step (S2) is introduced into in a feature pyramid network (FPN). Up-sampling on high-level features, top-down connection on low-level features, and connection between peer levels are performed. Defect feature learning is performed by using three different scale spaces to enhance perception of the SKM-CNN to defects with different scales, so as to complete extraction of target features, where after the extraction of the target features, the support image data set and the query image data set generate category features and defect features.

(S3.3) A distance between a category feature matrix and a defect feature matrix is calculated. Defect category is determined according to a preset threshold range, where if the distance falls within the preset threshold range, a defect location is marked on a few-shot image.

The defect detection rate is improved by the target feature extraction followed by metric learning.

Figure 4:
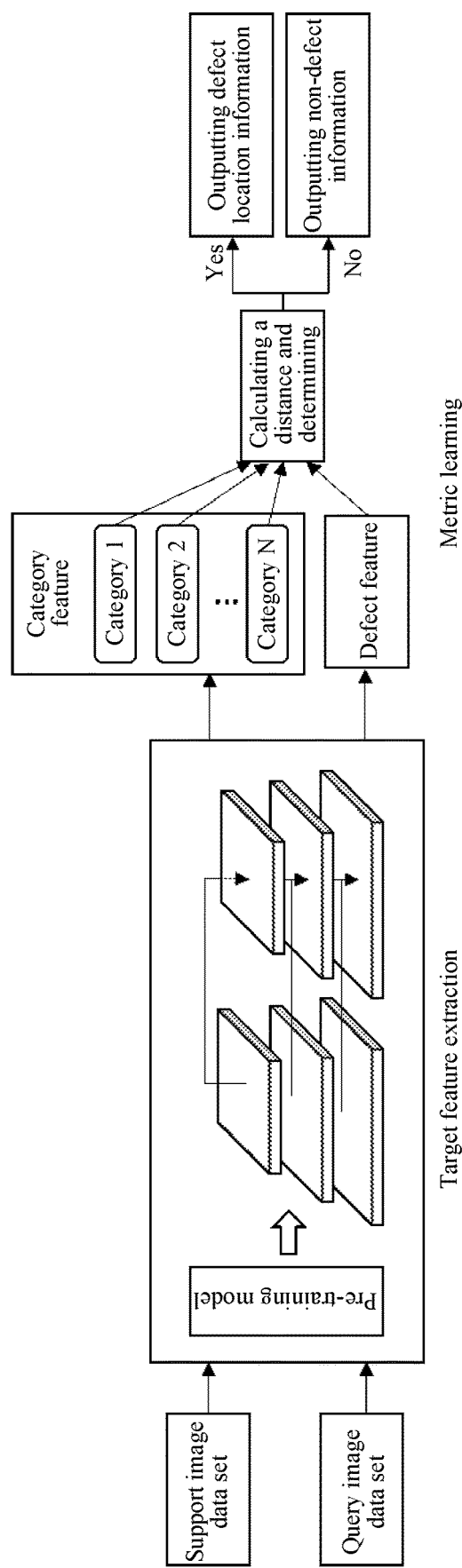
FIG. 4 is a structural diagram of a few-shot defect detection network ($S^2D^2N$) according to an embodiment of this disclosure.

FIG. 4 shows a structural diagram of the $S^2D^2N$.

In summary, the present disclosure has the following beneficial effects.

(1) The diversity of the few-shot defect data is increased by expanding a small data set through the GAN.

To solve the problems of low detection precision, low reliability, and overfitting after the training of a few-shot data set, the $G^2$-GAN is introduced herein, in which the real sample information is introduced based on the GAN. The generation of manufacturing samples is accelerated through two generators, and the few-shot defect set is expanded, increasing the sample diversity.

(2) A CNN based on attention mechanism is designed to train a data set sharing common features with the small sample, so as to generate a pre-training model, which is then transferred and learned to improve the detection precision.

The features of the auxiliary data set are extracted by using SKM-CNN to generate the pre-training model. The SKM attention module can adaptively adjust the convolution kernel size according to the object size and the distance from the imaging device to obtain feature images with different receptive fields. After the addition of the attention module, the network can automatically learn the optimal weight distribution, facilitating improving the generalization ability of the pre-training model.

(3) According to the hierarchical neural network model with sequential target feature extraction and metric learning, the defect detection can be quickly and efficiently completed, and the problems of poor detection precision, low reliability, and overfitting in the model trained in the lack of sample data are solved.

A few-shot defect detection network $S^2D^2N$ based on metric learning is introduced, and the loading of the pre-training model is loaded as the first step of a target feature extraction module. After that, a distance between a category feature matrix and a defect feature matrix is calculated, and the defect category and location are determined according to the distance.

(4) This application enables the high-precision detection of small defects of large assembly components in the case of a few-shot data set, and reduces the interference of human subjectivity, facilitating the assembly of the large assembly components, the stable operation of the high-end equipment, and the relieving of labor intensity.

It should be emphasized that the embodiments of the present disclosure are illustrative, which are not intended to limit the disclosure. It should be understood that improvements and modifications made by one of ordinary skill in the art without departing from the principle of the present disclosure shall fall within the scope of the present disclosure defined by the appended claims.

What is claimed is:

1. A few-shot defect detection method based on metric learning, comprising:

(S1) performing data enhancement on a to-be-detected few-shot defect data set by a $G^2$-Generative adversarial network ($G^2$-GAN);

(S2) extracting features of a defect data set similar to the to-be-detected few-shot defect data set by using a convolutional neural network based on selective kernel module (SKM-CNN) to generate a pre-training model; and (S3) transferring the pre-training model to a few-shot defect detection network ($S^2D^2N$) based on metric learning; and performing target feature extraction and metric learning in sequence to realize identification and location of defects;

wherein step (S1) comprises:

(S1.1) modifying a GAN to acquire the $G^2$-GAN, wherein the $G^2$-GAN comprises a first generator $G_1$, a second generator $G_2$, and a discriminator D; and setting the to-be-detected few-shot defect data set as a real sample set T; and adding random noise to a randomly-generated manufacturing sample to generate an initial manufacturing sample $C_1$;

(S1.2) subjecting the initial manufacturing sample $C_1$ to rough processing by using the first generator G to generate a manufacturing sample $C_2$;

(S1.3) simultaneously inputting a feature image of the real sample T and the manufacturing sample $C_2$ into the second generator $G_2$; and optimizing the manufacturing sample $C_2$ by using the feature image of the real sample T to obtain a manufacturing sample $C_3$, wherein the feature image is generated by a feature extraction module formed by N convolution layers and inverted residual modules alternately arranged; and (S1.4) simultaneously inputting the manufacturing sample $C_3$ and the real sample T into the discriminator D to determine whether the manufacturing sample $C_3$ is the real sample T; if yes, outputting the manufacturing sample $C_3$; otherwise, indicating that the manufacturing sample $C_3$ is not similar enough to the real sample T, and returning the manufacturing sample $C_3$ back to the first generator $G_1$ and repeating steps (S1.2)-(S1.4) until the manufacturing sample $C_3$ is determined to be the real sample T; and step (S3) comprises:

(S3.1) dividing the to-be-detected few-shot defect data set after the data enhancement into a support image data set and a query image data set;

(S3.2) introducing the pre-training model obtained in step (S2) into in a feature pyramid network (FPN); performing up-sampling on high-level features, top-down connection on low-level features and connection between peer levels; and performing defect feature learning by using three different scale spaces to enhance perception of the SKM-CNN to defects with different scales, so as to complete extraction of target features;

wherein after the extraction of the target features, the support image data set and the query image data set both generate category features and defect features; and (S3.3) calculating a distance between a category feature matrix and a defect feature matrix; and determining defect category according to a preset threshold range; wherein if the distance falls within the preset threshold range, a defect location is marked on a few-shot image.

2. The few-shot defect detection method of claim 1, wherein step (S2) comprises:

(S2.1) searching a public data set with similar defects to the to-be-detected few-shot defect data set as an auxiliary data set;

(S2.2) extracting features of the auxiliary data set by using the SKM-CNN; and (S2.3) saving the pre-training model.

3. The few-shot defect detection method of claim 2, wherein step (S2.2) comprises:

(S2.2.1) extracting the features of the auxiliary data set through a combination of convolution layer, SKM attention module and deep convolution, wherein the SKM attention module is configured to adaptively adjust a size of a convolution kernel according to target size and distance such that the SKM-CNN obtains different receptive field information;

(S2.2.2) increasing a resolution of a feature image by primary up-sampling and secondary up-sampling;

(S2.2.3) repeatedly utilizing, by a region-of-interest (ROI) pooling layer, a feature map generated in CNN to accelerate training and test of the pre-training model; and (S2.2.4) performing classification and prediction on the features of the auxiliary data set by using the convolution layer and a fully connected layer.

4. The few-shot defect detection method of claim 2, wherein in step (S2.2), two skip connections are performed when the features of the auxiliary data set are extracted; a feature map after the SKM attention module is fused to be ahead of the secondary up-sampling, and a feature map before the primary up-sampling is fused to be after the ROI pooling layer, so that the pre-training model retains sufficient local feature information and generalization of the pre-training model is enhanced.

* * * * *